(12) United States Patent
Galvin (10) Patent No.: US 11,981,584 B2
(45) Date of Patent: May 14, 2024

(54) METHOD FOR SEPARATING LOW DENSITY PARTICLES FROM FEED SLURRIES

(71) Applicant: NEWCASTLE INNOVATION LIMITED, Callaghan (AU)

(72) Inventor: Kevin Patrick Galvin, Callaghan (AU)

(73) Assignee: NEWCASTLE INNOVATION LIMITED, Callaghan (AU)

(*) Notice: Subject to any disclaimer, the term of this patent is extended or adjusted under 35 U.S.C. 154(b) by 547 days.

(21) Appl. No.: 17/350,797

(22) Filed: Jun. 17, 2021

(65) Prior Publication Data

US 2021/0317009 A1 Oct. 14, 2021

Related U.S. Application Data (62) Division of application No. 13/701,668, filed as application No. PCT/AU2011/000682 on Jun. 2, 2011, now Pat. No. 11,066,312.

(30) Foreign Application Priority Data

Jun. 3, 2010 (AU) ................................ 2010902439

(51) Int. Cl.
*B03B 5/00* (2006.01)
*B03B 5/32* (2006.01)
(Continued)

(52) U.S. Cl.
CPC .................. *C02F 1/24* (2013.01); *B03B 5/00* (2013.01); *B03B 5/32* (2013.01); *B03B 5/62* (2013.01); *B03D 1/1418* (2013.01); *B03D 1/1481* (2013.01); *B03D 1/242* (2013.01); *B03D 1/245* (2013.01); *B04B 1/00* (2013.01); *B04B 1/04* (2013.01)

(58) Field of Classification Search
CPC .. B01J 8/18; B03B 1/1481; B03B 5/62; C02F 1/24
See application file for complete search history.

(56) References Cited

U.S. PATENT DOCUMENTS 3,351,199 A 11/1967 Zvejnieks
3,371,779 A 3/1968 Hollingsworth et al.
(Continued)

FOREIGN PATENT DOCUMENTS

CN 1390632 A 1/2003
CN 1724418 A 1/2006
(Continued)

OTHER PUBLICATIONS

Manivasagan et al., Optimization studies in an Inverse Fluidized Bed Bioreactor for Starch Wastewater Treatment, Sep. 2009, p. 1.
(Continued)

*Primary Examiner* — Bradley R Spies
(74) *Attorney, Agent, or Firm* — Brooks Kushman P. C.; John E. Nemazi (57) ABSTRACT

In a method for separating low density particles from feed slurries, a bubbly mixture is formed in a downcomer and issues into a mid region in a chamber. An inverted reflux classifier is formed by parallel inclined plates below the mid region allowing for efficient separation of low density particles which rise up to form a densely packed foam in the top of the chamber, and denser particles which fall downwardly to an outlet.

24 Claims, 4 Drawing Sheets

(51) Int. Cl.
  *B03B 5/62* (2006.01)
  *B03D 1/14* (2006.01)
  *B03D 1/24* (2006.01)
  *B04B 1/00* (2006.01)
  *B04B 1/04* (2006.01)
  *C02F 1/24* (2023.01)

(56) References Cited

U.S. PATENT DOCUMENTS

| | | |
|---|---|---|
| 3,451,550 A | 6/1969 | Cox |
| 3,669,883 A | 6/1972 | Huckstedt et al. |
| 3,775,301 A | 11/1973 | Hayes |
| 3,953,332 A | 4/1976 | Speth et al. |
| 4,431,531 A | 2/1984 | Hollingsworth |
| 4,855,065 A | 8/1989 | Keeter et al. |
| 4,883,603 A | 11/1989 | Roggenstein et al. |
| 4,964,576 A | 10/1990 | Datta |
| 5,167,375 A | 12/1992 | Datta |
| 5,234,112 A | 8/1993 | Valenzuela et al. |
| 5,447,702 A | 9/1995 | Campbell et al. |
| 5,511,669 A | 4/1996 | Bourke |
| 5,914,034 A | 6/1999 | Ding et al. |
| 5,947,299 A | 9/1999 | Vazquez et al. |
| 6,059,118 A | 5/2000 | Ding et al. |
| 6,814,241 B1 | 11/2004 | Galvin |
| 2007/0017874 A1 | 1/2007 | Renaud et al. |
| 2007/0278144 A1 | 12/2007 | Wong |
| 2008/0193340 A1 | 8/2008 | Cocco et al. |
| 2008/0308502 A1 | 12/2008 | Jameson |
| 2009/0288995 A1 | 11/2009 | Lambert |
| 2010/0116746 A1 | 5/2010 | Pfeffer et al. |
| 2011/0062090 A1 | 3/2011 | Bara et al. |
| 2011/0236274 A1 | 9/2011 | Buchmueller |
| 2012/0006744 A1 | 1/2012 | Phattaranawik et al. |
| 2012/0111436 A1 | 5/2012 | Matsufuji et al. |

FOREIGN PATENT DOCUMENTS

| | | |
|---|---|---|
| GB | 2211114 A1 | 6/1989 |
| WO | 8604270 A1 | 7/1986 |
| WO | 0045959 A1 | 8/2000 |
| WO | 2006134235 A1 | 12/2006 |
| WO | 2008064406 A1 | 6/2008 |
| WO | 2011150455 A1 | 12/2011 |

OTHER PUBLICATIONS

Escudie et al. The Canadian Journal of Chemical Engineering Feb. 2007, vol. 85, pp. 25-35, "Layer Inversion and Bed Contraction in Down-Flow Binary-Solid Liquid-Fluidized Beds".

Extended European Search Report for European Application No. EP 11788973.3, Completed by the European Patent Office, dated Sep. 15, 2017, 9 Pages.

International Search Report for PCT/AU2011/000682, Completed by the Australian Patent Office on Aug. 5, 2011, 5 Pages.

METHOD FOR SEPARATING LOW DENSITY PARTICLES FROM FEED SLURRIES

CROSS-REFERENCE TO RELATED APPLICATIONS

This application is a Divisional of U.S. patent application Ser. No. 13/701,668 filed Dec. 3, 2012, which is the U.S. national phase of PCT Application No. PCT/AU2011/000682 filed on Jun. 2, 2011, which claims priority to Australian Patent Application No. 2010902439 filed on Jun. 3, 2010, the disclosures of which are hereby incorporated in their entirety by reference herein.

FIELD OF THE INVENTION

This invention relates to a method and apparatus for separating low density particles from feed slurries containing such particles and has been devised particularly though not solely as an enhanced process of froth flotation as applied to fine coal or fine minerals used to concentrate hydrophobic particles.

Throughout this specification the term "low density particles" is used to refer to particles that may be solid-like, liquid-like, or gas-like, and in all cases less dense than the surrounding fluid which may for example be water. More specific examples of low density particles may include oil drops or even gas bubbles.

BACKGROUND

It has been proposed in the past to separate low density particles from a feed slurry by introducing the feed above a set of parallel inclined channels where ideally the vast majority of the slurry is transported down through the inclined channels. The low density particles then escape the flow, rising towards the downward facing inclined surfaces of the channels, collecting as an inverted sediment and then sliding up the inclined channels. By this means, the low density particles concentrate on the top half of the device and in turn report to the overflow. This method and apparatus is described in the International Patent Application Number PCT/AU2007/001817 entitled "Method of Operating an Inclined Plate Classifier" with specific reference to FIG. 5 of that specification. It is there described how low density particles and a portion of the slurry report to the overflow via an overflow launder while wash water is added at the top and allowed to flow downwards in order to remove possible contaminants. The arrangement of parallel plates forming inclined channels in the inclined plate classifier has often been referred to as a "reflux classifier".

The present invention aims to improve on the operation of a reflux classifier for the separation of low density particles by fully inverting the reflux classifier and providing an upper fluidisation chamber at the top end of the device.

SUMMARY

Accordingly, in one aspect, the present invention provides a method of separating low density particles from feed slurries containing such particles, said method comprising the steps of:
introducing the feed slurry into a chamber having a substantially enclosed upper end and a plurality of inclined surfaces in the lower end;
allowing the slurry to flow downwardly between the inclined surfaces such that the low density particles escape the flow by sliding up lower faces of the inclined surfaces while the denser particles in the slurry slide down upper faces of the inclined surfaces;
removing the denser particles from the lower end of the chamber;
forming an inverted fluidised bed in the chamber above the plurality of inclined surfaces;
allowing the low density particles to form into a concentrated suspension at the upper end of the chamber; and
removing the concentrated suspension of low density particles at a controlled rate from the upper end of the chamber.

Preferably the plurality of inclined surfaces are arranged to form a set of parallel inclined channels.

Preferably wash water is introduced under pressure into the upper end of the chamber.

Preferably the wash water is introduced uniformly through the enclosed upper end of the chamber.

Preferably, the concentrated suspension of low density particles is guided to an exit point in the upper end of the chamber where it is removed at the controlled rate by the operation of an upper valve.

Preferably the denser particles are removed from the lower end of the chamber at a controlled rate by the operation of a lower valve or pump.

Preferably the operation of the upper valve and the lower valve or pump are controlled by measuring the suspension density in the upper part of the chamber and operating the valves and/or pump to keep the depth of low density particles within a predetermined range in the upper end of the chamber.

In one form of the invention, additional fluidisation is provided below the inclined channels.

In a further aspect, the present invention provides an apparatus for separating low density particles from feed slurries, said apparatus comprising:
a chamber having a substantially enclosed upper end and a plurality of inclined surfaces in the lower end;
feed means arranged to feed slurry into the chamber;
upper control means arranged to allow concentrated suspensions of low density particles to be removed from the upper end of the chamber at a controlled rate; and
lower control means arranged to allow denser particles to be removed from the lower end of the chamber below the inclined surfaces at a controlled rate.

Preferably the substantially enclosed upper end of the chamber is shaped to direct the concentrated suspensions of low density particles toward the upper control means.

More preferably the upper end of the chamber is shaped as a cone with the upper control means provided in the form of an upper valve located at the apex of the cone.

Preferably the lower control means is provided in the form of a lower valve or a pump.

Preferably the control means are operable by measuring the depth of low density particles in the upper part of the chamber and opening or closing the upper and lower valves and/or operating the pump to keep the depth of low density particles within a predetermined range.

Preferably the upper end of the chamber is perforated and wash water feed means are provided arranged to introduce wash water under pressure into the chamber through the perforations.

Preferably the plurality of inclined surfaces are arranged to form a set of parallel inclined channels.

Preferably the set of parallel inclined channels are formed by an array of parallel inclined plates.

Yet another aspect of the invention provides a method of separating low density particles from feed slurries containing such particles, said method comprising the steps of:

introducing the feed slurry downwardly through a feed box into a chamber having plurality of inclined surfaces in the lower end;

allowing the slurry to flow downwardly through the inclined channels such that the low density particles escape the flow by sliding up the inclined channels while the denser particles in the slurry slide down the channels;

removing the denser particles from the lower end of the chamber;

forming an inverted fluidised bed in the chamber above the set of parallel inclined channels; and     allowing the low density particles to move upwardly at a controlled rate through one or more confined passages between the outer walls of the feed box and the walls of the chamber to an overflow launder.

Preferably, the feed box incorporates a plurality of closely spaced parallel plates between which the feed slurry is fed, each plate having a porous sparger surface through which low density particles are passed into channels between the plates forming a bubbly mixture or emulsion, which issues from the lower end of the feed box. In one preferred form, the sparger generates or forms the low density particles from a fluid such as a gas to produce air bubbles. In another preferred form, a sparger type structure, such as a membrane, may be used to form drops from a low density liquid. In a further preferred form, the sparger type structure may involve a paste-like solid that is forced through the porous material.

Preferably, the porous plates in the feed box are sufficiently closely spaced to form a laminar flow profile between the plates inducing a high shear rate into the bubbly flow.

Preferably, the outer surfaces of the feed box are sufficiently closely spaced to the upper casing of the chamber so as to cause restricted upward movement of the low density particles to the overflow resulting in fast entrainment of low density particles.

BRIEF DESCRIPTION OF THE DRAWINGS

Notwithstanding any other forms that may fall within its scope, one preferred form of the invention will now be described by way of example only with reference to the accompanying drawings in which.

DETAILED DESCRIPTION

The preferred form of the invention will be described with the method and apparatus being used for froth flotation, as typically applied to fine particles of coal and mineral matter and used to concentrate hydrophobic particles of coal.

These hydrophobic particles selectively adhere to the surface of air bubbles, leaving hydrophilic particles in suspension between the bubbles. Thus once the hydrophobic particles become attached to the air bubbles a new hybrid particle is formed which is of an overall density much less than the density of the water. The attached hydrophobic particle then has a segregation velocity in the upwards direction which is very high compared to the downward superficial velocity of the suspension of denser particles.

In most flotation situations certain reagents need to be added to promote flotation. A collector may be added to promote the hydrophobicity of the hydrophobic coal particles. In particular, a surfactant (sometimes called a "frother") is added to stabilise the bubbles and hence the foam formed as the bubbles seek to exit the bulk liquid. Surfactant adsorbs at the surface of the bubble helping to prevent bubble coalescence, and hence preserving the "low density particles". This is especially important when the bubbles are forced through the top valve.

Conventional froth flotation is attractive because the segregation velocity of the hydrophobic particles is governed by the rise velocity of the bubbles, and hence ultrafine particles less than 100 microns can be transported at very high rates regardless of their size. A second major attraction of froth flotation is the "de-sliming" that is achieved when the remaining suspension is allowed to drain back through the froth. Further, by adding wash water to the free-surface of the froth at the top the vessel, the suspension of hydrophilic particles can be washed away, producing a cleaner froth product.

But it is well known that the addition of wash water to the froth product is inefficient and non-uniform, and hence that the froth product is not as "clean" as might be preferred. If an excessive water addition rate is used there will be a strong tendency to create an opening in the froth resulting in the added water passing down through that opening producing little benefit. So water addition rates need to be limited to relatively low levels and need to be distributed uniformly.

A more efficient form of froth flotation can be achieved according to the present invention using the apparatus as described below with reference to FIG. 1. The apparatus comprises a chamber 1 having a substantially enclosed upper end 2 and a lower end 3 in which are located a set of parallel inclined channels 4. The parallel inclined channels are typically formed by the inclined sides 5 of the lower end 3 of the chamber 1 and a set of parallel inclined plates 6 located parallel to the inclined walls 5 so as to form the parallel inclined channels 4.

Figures 3, 4, 5:
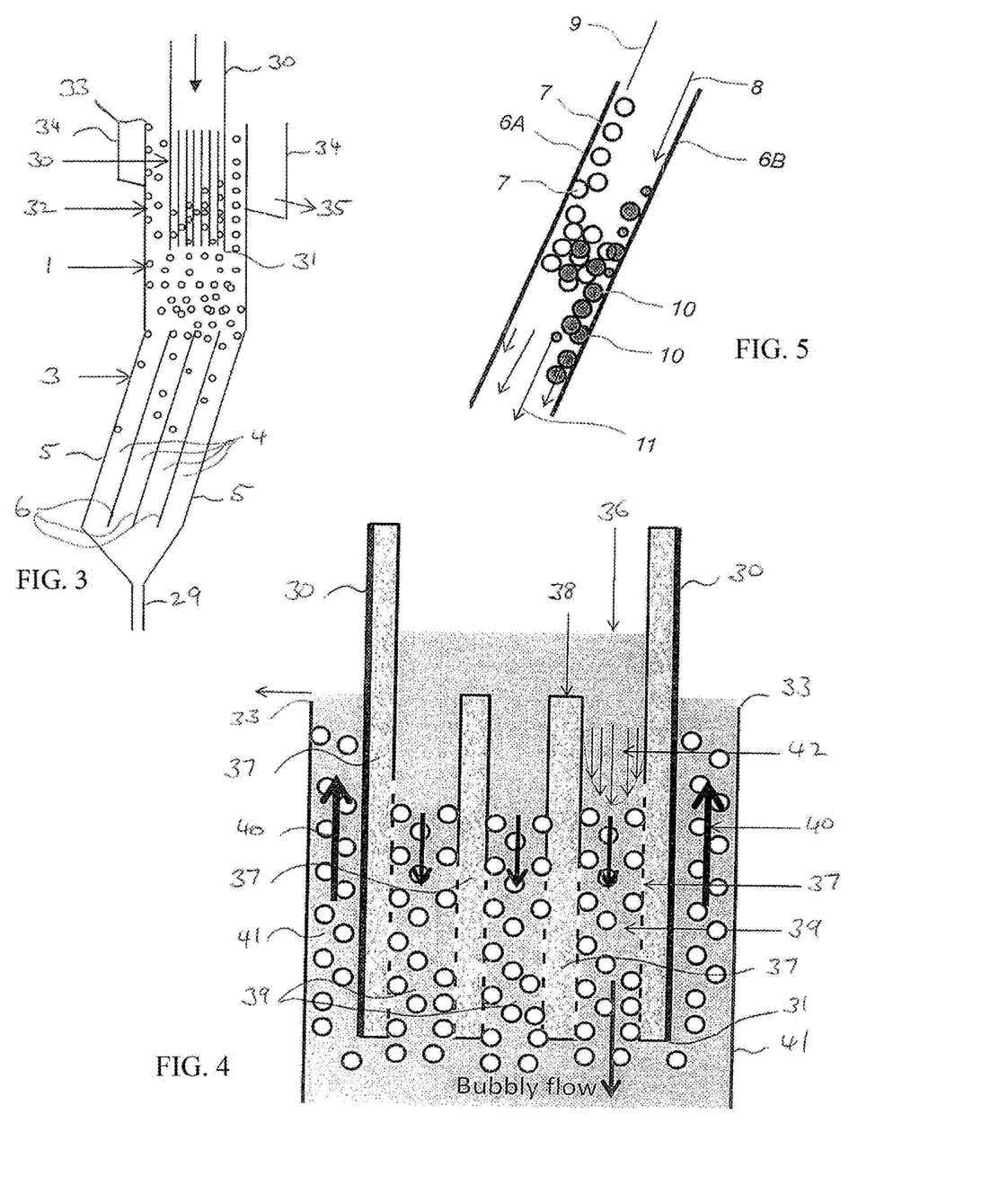
FIG. 3 is a diagrammatic cross-sectional elevation of an alternative form of apparatus for separating low density particles from feed slurries according to the invention.
FIG. 4 is an enlarged view of the bubbly flow generator shown in FIG. 3.
FIG. 5 is an enlarged diagrammatic vertical cross-section through one of the parallel inclined channels of the apparatus shown in FIG. 1, demonstrating particle movement within that channel.

In this manner an inverted "reflux classifier" is formed in the chamber and operates according to the mechanism shown in FIG. 5 where the low density particles 7 escape the general flow 11, rising towards the downwardly facing inclined surface of the plate 6A, collecting as inverted sediment, and then sliding up the inclined channels as shown at 9.

The denser particles such as those typically shown at 10 fall out of the downward sediment movement 8 toward the upwardly facing inclined surface of the plates 6B and slide down the inclined channels.

The feed slurry is introduced into the chamber at or about the mid-point as shown at 12 and those skilled in the art of froth flotation will appreciate that the feed to this device can be delivered in a variety of ways. One such way is the use of a vertical downcomer 14 which will be described in more detail with reference to FIG. 2.

Figure 2:
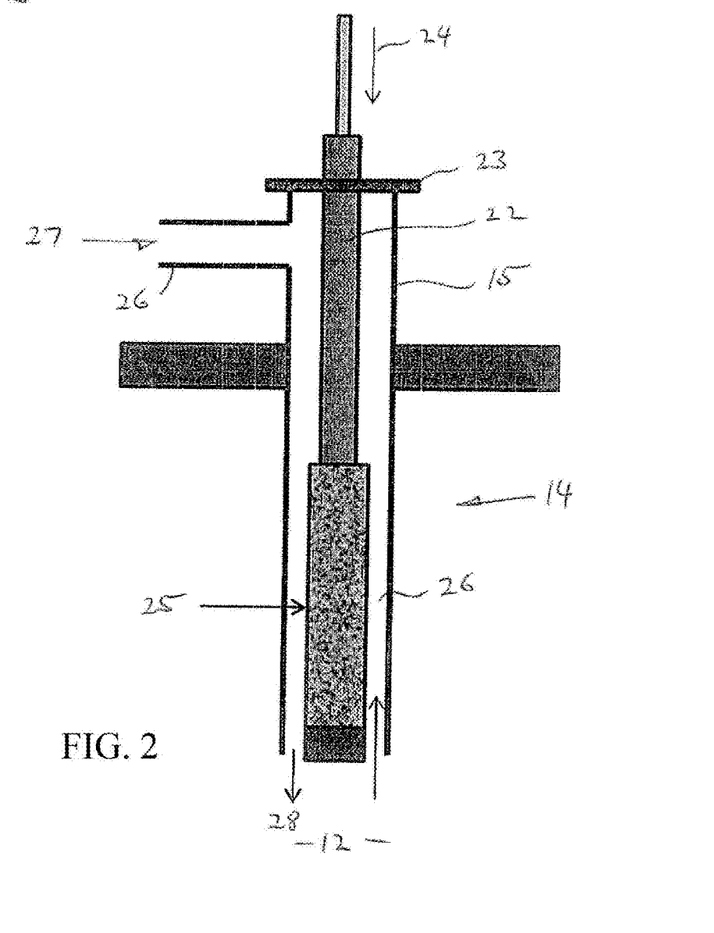
FIG. 2 is an enlarged view of a bubbly flow generator suitable for use in the apparatus shown in FIG. 1.

The downcomer comprises a generally vertical pipe 15 with an internal tube 22 which may be mounted into the top end of the chamber by way of a flange 23. Gas, such as air, is introduced into the top end of the tube as shown by arrow 24 and passes down through the tube to a sparger section 25 located in the lower section of the pipe 15.

The particle suspension may be introduced through side inlet 26 as shown by arrow 27 where it passes down the pipe 15 to meet gas bubbles issuing from the sparger section 25. Because there is a relatively narrow annulus 26 between the sparger section 25 and the wall of the pipe 15, a high shear rate is introduced in the flow in the annulus 26 resulting in a well mixed bubbly flow issuing from the lower end of the downcomer at 28.

The upper end of the chamber 1 is shaped to direct the concentrated suspensions 16 of low density particles toward an upper outlet 13. This is typically achieved by shaping the upper end of the chamber as a cone 17 with the upper outlet 13 located at the apex of the cone as can be seen in FIG. 1.

The cone is preferably perforated so that wash water can be introduced into the upper end of the chamber at 18 under pressure and forced through perforations in the cone 17 in a uniform manner into the concentrated suspension 16 of low density particles. When the top of the froth is enclosed in this manner, which occurs when a fluidisation zone is used, the froth is fully contained, and lacks the degree of freedom to flow away from the added water. The froth is forced to engage with the wash water and distribute that wash water more evenly. Moreover, since the froth is only free to leave the system via a central overflow pipe 19 of small cross-section the froth is forced to accelerate towards the outlet 13 irrespective of the downwards wash water addition.

In the present invention the rising froth is forced to leave through a narrow opening in the top of the device. When a foam is forced through a constriction it tends to accelerate and to also stabilise. The froth emerging from the smaller opening will sometimes look more refined, with smaller size air bubbles. Given the increased transport velocity of the foam, any particle loss from a gas bubble interface is readily recovered by air bubbles rising upwards from below, hence hydrophobic particles should not tend to be lost from the froth product.

Moreover, in the present invention there is the opportunity to force much more wash water down through the top of the vessel. This has the effect of preventing froth from forming. In fact a fluidised bed of bubbles will tend to form, with significant quantities of clean water freely moving downwards between the rising air bubbles. Hence the hydrophilic particles can then be completely washed away. This is especially significant in applications involving large quantities of fine clays in the froth flotation of coal. The removal of these clays is a major challenge in the industry, especially with seams that carry high clay content. Unless these clays can be removed it becomes impossible to produce a clean product that meets the requirements of coal markets.

An inverted fluidised bed is arguably the only way to achieve the goal of high slimes removal in froth flotation. While inverted fluidised beds may have been used in the past to fluidise particles less dense than the fluid, they have not been used in the context of froth flotation, and have not been used to improve slimes removal during flotation.

The inverted fluidised bed is achieved in the present device by removing the "free surface" commonly seen in froth flotation devices. Free surfaces of this type make it difficult to efficiently engage the wash water without forming channels or holes in the froth.

At the base of the chamber 1 it is also possible to make provision for an additional fluidisation chamber 20. Fluidisation near the base provides a means for assisting particles that would otherwise settle onto the base of the vessel to discharge more easily through the outlet.

It is further noted that the vast majority of the volumetric flow would normally tend to discharge out the bottom of the vessel. Hence the system would operate effectively under dilute conditions, and hence there would be good distribution of this flow down all of the inclined channels. Higher system concentrations could still be used.

It is further noted that the device would operate effectively at feed and gas rates higher than used in a conventional froth flotation device, and would operate with higher wash water rates. These higher rates are made possible by the powerful effect of the inclined channels in the lower part of the system. These channels provide for an increase in the effective vessel area allowing gas bubbles that might otherwise be entrained downwards to the underflow to rise upwards towards the overflow.

In a further variation it is possible to make the gaps between the inclined channels at the exit of the inclined channels narrower. This would have the effect of increasing the pressure drop through the inclined channels and hence forcing a more even flow through each of the inclined channels. This reduction in the gap would best be formed by a taper so that there is no abrupt blockage of the sediment. The narrowing would only be in the bottom portion of the inclined channels.

An alternative arrangement shown in FIG. 3 is designed for high volumetric feed rates and low solids concentrations or low feed grades. In this arrangement, the feed slurry is fed into the chamber 1 through a feed box 30 which will be described in more detail below with reference to FIG. 4. The bubbly flow issues from the lower end 31 of the feed box 30 into the chamber 1 as previously described and the rising gas bubbles with attached hydrophobic particles rise upwardly on either side 32 of the feed box until they overflow the upper end of the chamber at 33 into a launder 34 for discharge as shown at 35.

Turning now to FIG. 4 it can be seen that the feed slurry introduced at 36 flows downwardly through a system of closely spaced parallel plates 37 which are aligned vertically as shown in FIG. 4, but which could be inclined if desired. The plates 37 are hollow and enclosed by a porous material. The gas supply shown diagrammatically at 38 is fed to the plate in a controlled manner such that fine bubbles in the order of 0.3 mm diameter will emerge from the porous sections of each plate and interact with the hydrophobic particles. Hydrophobic particles attached to the air bubbles are entrained downwards through the vertical channels 39 and then become entrained upwards through narrow passages 40 between the feed box 30 and the outer vessel wall 41. The bubbles and attached particles then progress to the product overflow launder 34 as shown in FIG. 3.

It will be appreciated that the embodiments of FIGS. 3 and 4 equally apply where the low density particles are oil drops within an emulsion, instead of gas bubbles within a bubbly mixture.

The advantage of a feed box as shown in FIG. 4 is that a precise laminar flow field is formed in each channel 39 as shown diagrammatically by the laminar flow profile 42. The laminar flow field has a high shear rate in the range $10 \text{ s}^{-1}$ to $1000 \text{ s}^{-1}$. This high shear rate is achieved by laminar flow as shown by the profile 42 which enables a high flow rate of bubbly mix to be achieved at the outlet from the feed box 30.

The objective is to recover all of the hydrophobic particles and, in this case, some entrained hydrophilic particles in the final product can be anticipated. In this arrangement it is not essential for foam to form. There are benefits in not having to maintain or control foam because foams can be highly variable in their stability.

Figure 1:
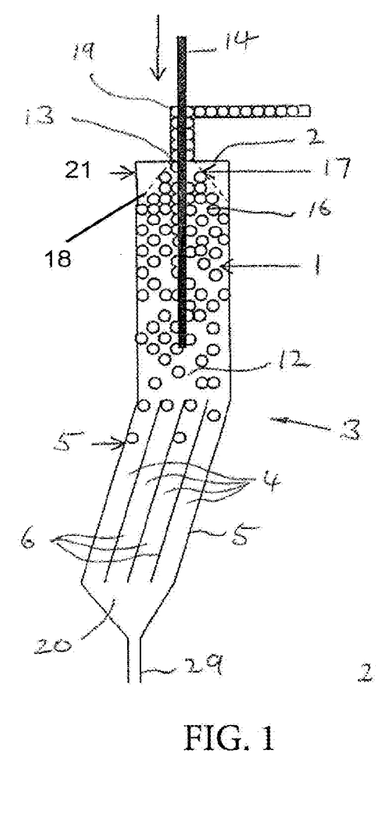
FIG. 1 is a diagrammatic cross-sectional elevation through apparatus for separating low density particles from feed slurries according to the invention.
Figure 6:
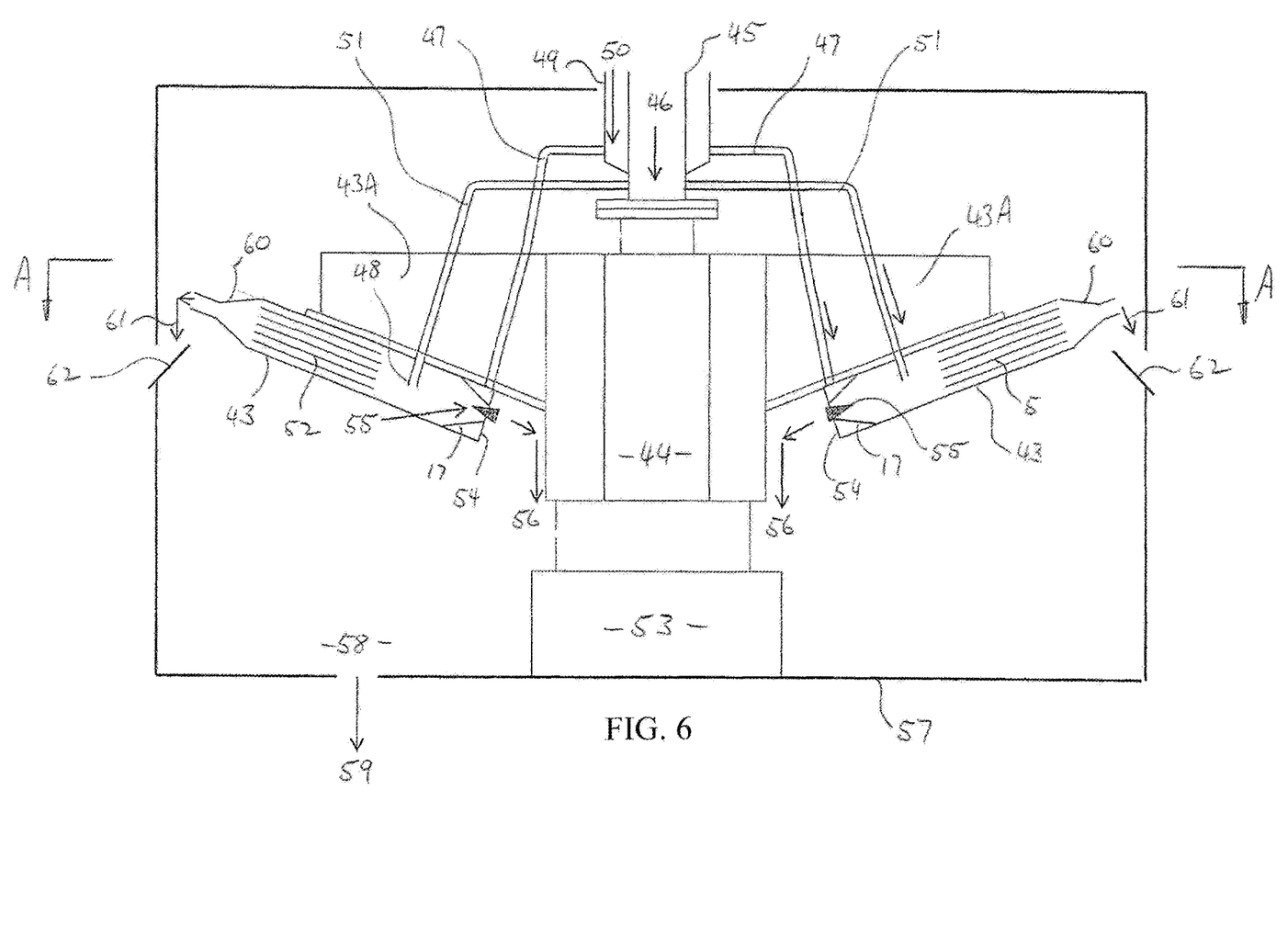
FIG. 6 is a diagrammatic cross-sectional elevation of apparatus for separating low density particles from feed slurries according to the invention when arranged in a centrifuge device to increase the rate of separation of low density particles.
Figure 7:
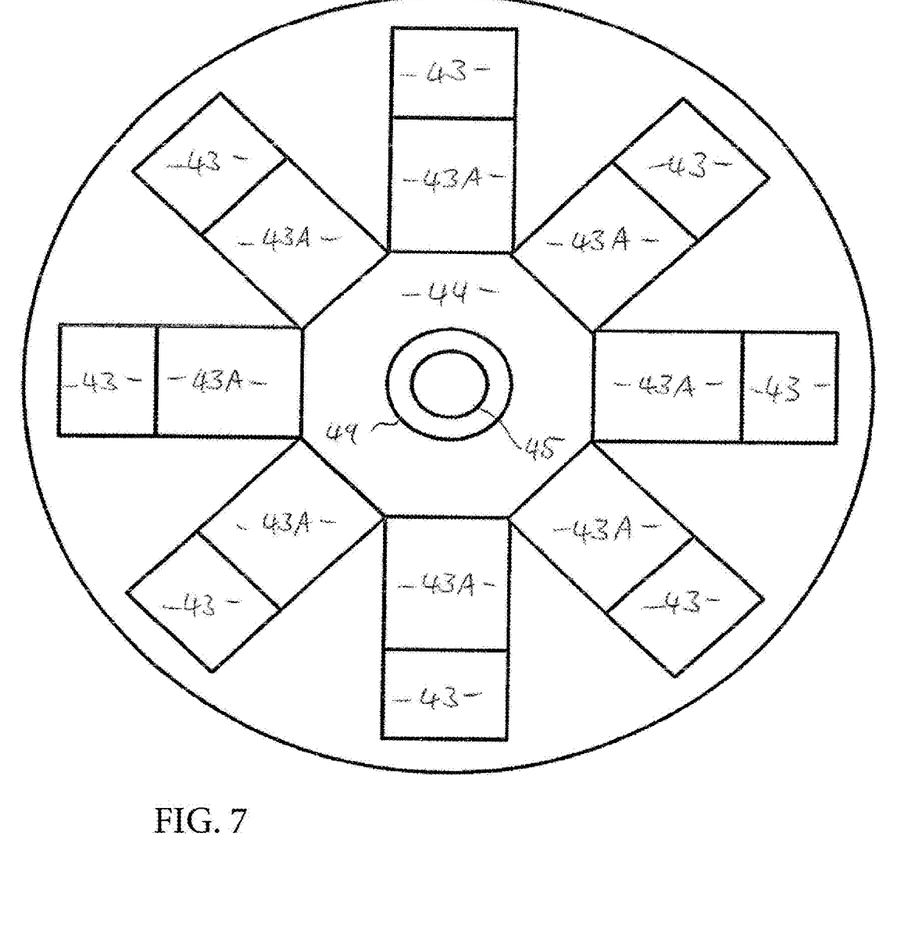
FIG. 7 is a diagrammatic cross-sectional plan view on the line AA of FIG. 6.

In a further enhancement of the invention, the rate of separation of low density particles (oil drops, hollow particles, bubbles, etc.) can be increased by subjecting an inverted reflux classifier of the type shown in either FIG. 1 or FIG. 3 to centrifical forces. This arrangement is shown in FIGS. 6 and 7.

A number of chambers of the type shown at 1 in either FIG. 1 or FIG. 3 can be arranged in a generally flat but inclined manner as shown at 43 supported by arms 43A extending radially outwardly from a central hub 44. Any suitable number of boxes 43 can be chosen but in the arrangement as clearly seen in FIG. 7 there are 8 boxes arrayed like the spokes of a wheel and extending outwardly from the octagonal hub 44.

The feed slurry is fed in through a central hollow shaft 45 as shown by arrow 46 from where it feeds outwardly through radial pipes 51 to entry points 48 in the boxes 43.

The fluidisation wash water can similarly be feed in through annulus 49 as shown by arrow 50 and hence through pipes 47 into the area at the head of each box 43 and hence outwardly through the perforated cones 17 arranged in a similar manner to that previously described with reference to FIG. 1.

Each inclined box 43 is provided with inclined channels 52 which act in a similar manner to the channels 4 shown in FIG. 1.

In practice, the device is rotated at a suitable speed about a bearing 53 to provide an enhanced gravitational field within the boxes 43 which are subjected to centrifical forces. The low density particles report to the inner ends 54 of the boxes 43 where they can be discharged through valves 55 and overflow downwardly as shown by arrows 56 to be collected in the bottom of a surrounding chamber 57 where they can be discharged through an outlet 58 as overflow at arrow 59.

The underflow containing hydrophilic particles more dense than the fluid reports to the outer ends 60 of the inclined boxes 43 where it is discharged at 61 and collected through an underflow chute 62.

The fluidisation water entering at 50 is used to help clean the low density product of so-called "slimes".

The parallel plates in the boxes 43 are typically aligned at an angle of 70° to the hub 44 and hence 20° to the centrifical force and are used to retain low density particles within the inner section of the device, allowing liquid and other contaminants, e.g. slimes, to discharge to the underflow via the outer section of the device.

By these means the present invention provides a new technology for recovering and concentrating low density particles, where the particle density is less dense than the fluid, for example water. The arrangement is shown in FIG. 1. In effect the Reflux Classifier is fully inverted, thus providing an upper fluidisation chamber 21 at the top of the device, connected to a vertical section, and then a section consisting of parallel inclined channels. At the very base there is the additional option of also including a fluidisation section in order to assist with the discharge of the slurry from the base and prevent build up of the denser particles that might also be present in the feed.

Thus what is proposed here is the concept of an inverted fluidised bed for separating particles, especially particles less dense than the fluid from particles more dense than the fluid. The inverted arrangement allows wash water to be added under pressure, allowing larger superficial velocities of wash water to be forced back down the zone of low density particles that concentrate in the upper vertical section of the device. The concentrated suspension of low density particles is then forced to move inwards at the top and in turn pass out through a central exit point. A valve 13 at the exit point controls the rate of discharge with reference to a measured suspension density in the upper vertical section.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of separating particles within a feed slurry, said method comprising the steps of:

feeding the feed slurry into a conduit extending into a separation chamber, the separation chamber having an upper region, a lower region, an upper end defining an upper boundary of the upper region, and a lower end defining a lower boundary of the lower region;

feeding a gas into the conduit;

allowing the gas and the feed slurry to mix within the conduit and discharge as a bubbly mixture from a discharge end of the conduit into a separation chamber;

arranging a wash water feeder above the upper end of the separation chamber, the wash water feeder fluidly communicating with the upper region of the separation chamber via the upper end;

forcing wash water under pressure with the wash water feeder through the upper end and into the upper region of the separation chamber such that the wash water directly contacts the particles in the upper region of the separation chamber;

forming a fluidized bed of bubbles from the discharged bubbly mixture in the separation chamber above a plurality of inclined channels located in the lower region of the separation chamber, allowing the bubbly mixture to flow through the separation chamber and into the inclined channels such that some of the particles escape the downward bubbly mixture flow and slide up the downwardly facing inclined surfaces of the inclined channels while other particles in the bubbly mixture travel down the inclined channels;

removing concentrated suspensions of particles from the upper region of the separation chamber through a first outlet arranged in the separation chamber and being located above both the inclined channels and the discharge end of the conduit, and removing the other particles from the separation chamber at a controlled rate through a second outlet arranged in the separation chamber below both the inclined channels and the discharge end of the conduit.

2. The method of claim 1, wherein the gas is fed into an at least one internal hollow tube arranged in the conduit for delivering the gas into the feed slurry.

3. The method of claim 1, comprising forming the fluidized bed of bubbles as an inverted fluidized bed.

4. The method of claim 3, wherein the wash water feeder or the upper end comprises perforations for supplying water or other fluid for supporting the formation of the inverted fluidized bed.

5. The method of claim 1, comprising arranging the first outlet at the upper end of the separation chamber.

6. The method of claim 1, comprising arranging the inclined channels as parallel channels formed by a plurality of parallel plates.

7. The method of claim 6, wherein the parallel channels are arranged at an oblique angle relative to the downward flow of the bubbly mixture.

8. The method of claim 1, comprising shaping the upper end like a cone and guiding the concentrated suspensions of particles toward the first outlet using the upper end for removal at a controlled rate.

9. The method of claim 1, comprising providing a plurality of separation chambers, each having the conduit and inclined channels, arranging the separation chambers to extend radially outwardly from and rotate about a central hub, and forming an enhanced gravitational field within each separation chamber when the central hub is rotated.

10. The method of claim 1, comprising surrounding the conduit by at least one of: the upper end, the first outlet arranged at the upper end of the separation chamber, and the wash water feeder.

11. The method of claim 1, comprising forcing wash water downwardly and/or radially through the upper end and into the upper region of the separation chamber.

12. The method of claim 1, comprising providing an open space in the separation chamber extending between the discharge end of the conduit and the inclined channels, the open space being devoid of features such that the open space is configured for providing uninterrupted flow of the bubbly mixture towards the inclined channels.

13. The method of claim 1, comprising configuring the upper end to uniformly deliver wash water from the wash water feeder to said concentrated suspensions of particles.

14. The method of claim 1, comprising configuring the wash water feeder to force wash water in a uniform manner through the upper end and into the upper region of the separation chamber.

15. The method of claim 1, wherein the concentrated suspensions of particles removed through the first outlet include at least one of hydrophobic particles, lower density particles, oil drops, hollow particles and gas bubbles; and wherein the other particles removed through the second outlet include hydrophilic particles or higher density particles.

16. The method of claim 1, wherein the wash water is forced under pressure with the wash water feeder through perforations in the upper end and into the upper region of the separation chamber.

17. The method of claim 1, wherein the wash water directly contacts the particles in the upper region of the separation chamber in the absence of a free surface between the particles in the upper region of the separation chamber and the upper end.

18. A method of separating particles from feed slurries, said method comprising:
feeding the feed slurry into a feed box having a plurality of hollow porous parallel plates such that the feed slurry flows between the hollow porous parallel plates;
feeding a gas into at least one of the hollow porous parallel plates;
allowing the gas and the slurry to mix within the feed box and discharge as a bubbly mixture from a discharge end of the feed box into a separation chamber, wherein the separation chamber has an upper region, a lower region, an upper end defining an upper boundary of the upper region, and a lower end defining a lower boundary of the lower region;
forming a fluidized bed of bubbles from the discharged bubbly mixture in the separation chamber above a plurality of inclined channels located in the lower region of the separation chamber;
allowing the bubbly mixture to flow through the separation chamber and into the inclined channels such that some of the particles escape the bubbly mixture flow and slide up the downwardly facing inclined surfaces of the inclined channels while other particles in the bubbly mixture travel down the channels;
removing said some of the particles from the separation chamber through a first outlet arranged in the separation chamber and located above both the inclined channels and the discharge of the feed box; and
removing the other particles from the separation chamber at a controlled rate through a second outlet arranged in the separation chamber and located below both the inclined channels and the discharge of the feed box.

19. The method of claim 18, comprising forming the fluidized bed of bubbles as an inverted fluidized bed.

20. The method of claim 18, wherein the porous plates in the feed box are sufficiently closely spaced to form a laminar flow profile between the plates inducing a high shear rate into the bubbly mixture flow.

21. The method of claim 18, wherein outer surfaces of the feed box are sufficiently closely spaced to sidewalls of the upper region of the separation chamber so as to cause restricted upward movement of said some of the particles to the first outlet.

22. A method of separating particles from feed slurries, said method comprising the steps of:
feeding the feed slurry into a conduit;
feeding a gas into the conduit;
allowing the gas and the slurry to mix within the conduit and discharge as a bubbly mixture from a discharge end of the conduit into a separation chamber, wherein the separation chamber has an upper region, a lower region, an upper end defining an upper boundary of the upper region, and a lower end defining a lower boundary of the lower region;

forcing wash water under pressure through the upper end and into the upper region of the separation chamber such that the wash water directly engages concentrated suspensions of particles within the upper region of the separation chamber at the upper end;

forming a fluidized bed of bubbles from the discharged bubbly mixture in the separation chamber above a plurality of inclined channels located in the lower region of the separation chamber, allowing the bubbly mixture to flow through the separation chamber and into the inclined channels such that some particles escape the downward bubbly mixture flow and slide up the downwardly facing inclined surfaces of the inclined channels while other particles in the bubbly mixture travel down the inclined channels;

removing the concentrated suspensions of particles from the upper region of the separation chamber through a first outlet arranged in the separation chamber and located above both the inclined channels and the discharge end of the conduit, and removing the other particles from the separation chamber at a controlled rate through a second outlet arranged in the separation chamber and located below both the inclined channels and the discharge end of the conduit.

23. The method of claim 22, wherein said some of the particles removed from the separation chamber through the first outlet include at least one of hydrophobic particles, lower density particles, oil drops, hollow particles and gas bubbles; and wherein the other particles removed from the separation chamber through the second outlet include hydrophilic particles or higher density particles.

24. The method of claim 22, wherein the concentrated suspensions of particles removed from the upper region of the separation chamber through the first outlet include at least one of hydrophobic particles, lower density particles, oil drops, hollow particles and gas bubbles; and wherein the other particles removed from the separation chamber through the second outlet include hydrophilic particles or higher density particles.

* * * * *